C. T. SHEPPARD.
FENCE STAPLE.
APPLICATION FILED JUNE 6, 1913.
1,087,264.
Patented Feb. 17, 1914.
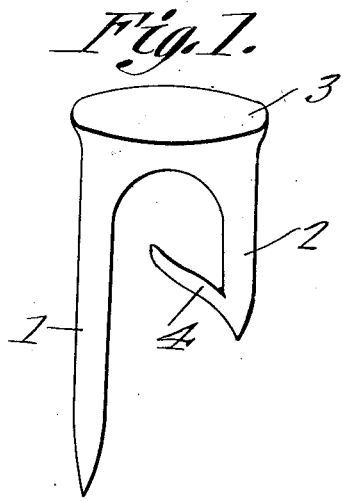
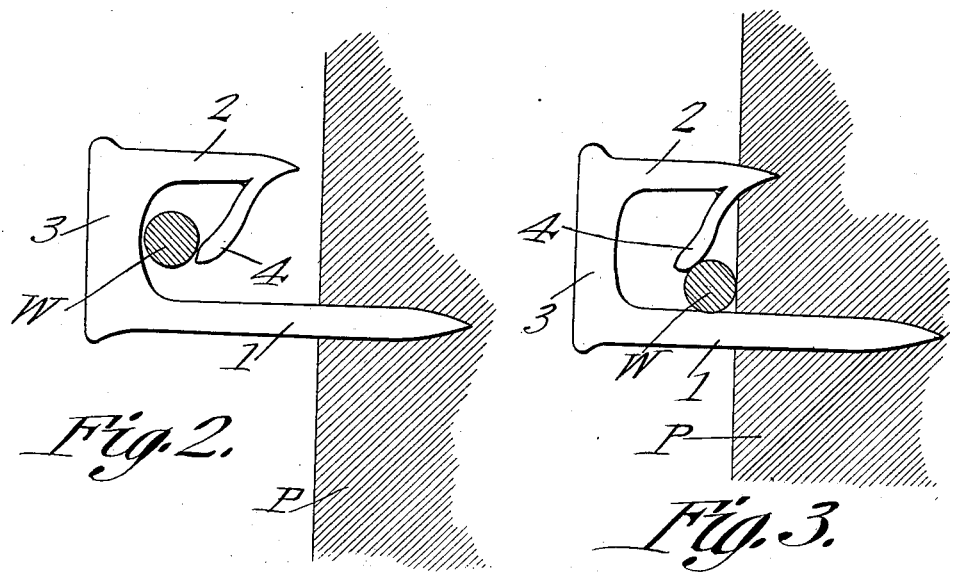
Witnesses
C. T. Sheppard
Inventor
by C. A. Snow & Co.
Attorneys

UNITED STATES PATENT OFFICE.

CHARLES T. SHEPPARD, OF HOLDENVILLE, OKLAHOMA.

FENCE-STAPLE.

1,087,264.　　　Specification of Letters Patent.　　Patented Feb. 17, 1914.

Application filed June 6, 1913. Serial No. 772,155.

*To all whom it may concern:*

Be it known that I, CHARLES T. SHEPPARD, a citizen of the United States, residing at Holdenville, in the county of Hughes and State of Oklahoma, have invented a new and useful Fence-Staple, of which the following is a specification.

The present invention appertains generally to staples, and relates more particularly to staples for securing fence wires to the fence posts.

It is the object of the present invention to provide a novel and improved device of the nature indicated which may be employed for securing the fence wires or strands to the posts in a facile and expeditious manner.

Another object of the present invention is to provide a staple of the character indicated which shall be comparatively substantial and inexpensive in construction, as well as convenient, serviceable and efficient in its use.

With the foregoing and other objects in view, which shall be apparent as the description proceeds, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a perspective view of the improved staple. Fig. 2 is an elevation of the staple with its long tine or driving shank driven into an object and with the short tine or prong spaced from the object so that the wire may be engaged to the staple. Fig. 3 is a view similar to Fig. 2 showing both tines or prongs engaged to the object.

In carrying out the invention, reference being had in detail to the drawing, the staple is provided with the relatively long and short tines or prongs 1 and 2, respectively, the main or primary tine 1 forming a driving shank. The intermediate portion or bend of the staple is formed into a driving head 3, the face of which extends beyond the axes of the tines. The secondary or supplemental tine 2 is provided with a flexible bill or finger 4 extending from a point adjoining its tip or free end. The bill or finger 4 is integral with the tine 2 and projects toward, but terminates short of, the butt end of the driving shank or main tine 1. In other words, the bill 4 extends diagonally inward from the tip of the tine 2.

In use, the driving shank or main tine 1 may be readily driven into the post or other object P, as illustrated in Fig. 2, so that the driving shank or tine 1 may be engaged to the post prior to the engagement of the tine 2 with the post. With the staple in this condition, the fence wire W may be passed over the tip of the tine 2 against the bill 4, and by further driving the staple into the post, the tine 2 may bite or engage the post, so that the wire W may be held between the post and the bill 4 against the tine 1 as seen in Fig. 3. If desired the wire W may be snapped within the bill or hook 4, as seen in Fig. 2. This is particularly desirable when fence wires or strands are strung up on posts standing in an irregular line, it being observed that the staples may be started into the respective posts, as illustrated in Fig. 2, which will permit the fence wire or strand to be snapped into the several staples. When the wire has been snapped under or within the bills or hooks 4, the wire will be locked against disengagement, and the staples may then be driven home. The staple may thus lock the wire to the post without the necessity of the staple being driven completely home or against the post, as is usual, it being noted that the driving shank or main tine 1 may be driven in the post or other object in the manner of an ordinary nail.

The staple may be readily extracted or withdrawn, when desired, and serves its functions in a highly efficient and desirable manner.

This staple is also highly desirable for use on hard wood posts, or the like.

What is claimed as new is:—

1. A staple having a yielding bill projecting from one tine toward the other to engage or snap over a fence wire.

2. A staple having relatively long and short tines, and a yielding bill projecting from the short tine toward the other to engage or snap over a fence wire.

3. A staple having relatively long and short tines, and having a yielding bill extending diagonally inward from the tip of the short tine toward the other to engage or snap over a fence wire.

4. A staple embodying a driving shank and a short tine having a driving head therebetween, the short tine having a yielding bill projecting toward the driving shank to engage or snap over a fence wire.

In testimony that I claim the foregoing as my own, I have hereto affixed my signature in the presence of two witnesses.

CHARLES T. SHEPPARD.

Witnesses:
B. J. SIMMONS,
FLEET BENNETT.

Copies of this patent may be obtained for five cents each, by addressing the "Commissioner of Patents, Washington, D. C."